US012599871B2

(12) United States Patent
Gorges et al.

(10) Patent No.: US 12,599,871 B2
(45) Date of Patent: Apr. 14, 2026

(54) EXHAUST GAS SCRUBBER WITH ENERGY INTEGRATION

(71) Applicants: thyssenkrupp Industrial Solutions AG, Essen (DE); thyssenkrupp AG, Essen (DE)

(72) Inventors: Max Eliot Gorges, Dortmund (DE); Ivo Mueller, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 973 days.

(21) Appl. No.: 17/767,667

(22) PCT Filed: Oct. 2, 2020

(86) PCT No.: PCT/EP2020/077742
§ 371 (c)(1),
(2) Date: Apr. 8, 2022

(87) PCT Pub. No.: WO2021/069334
PCT Pub. Date: Apr. 15, 2021

(65) Prior Publication Data
US 2024/0115992 A1      Apr. 11, 2024

(30) Foreign Application Priority Data

Oct. 11, 2019  (BE) .................................... 2019/5678
Oct. 11, 2019  (DE) ..................... 10 2019 215 611.8

(51) Int. Cl.
B01D 53/34           (2006.01)
B01D 1/00            (2006.01)
(Continued)

(52) U.S. Cl.
CPC ........... B01D 53/343 (2013.01); B01D 1/007 (2013.01); B01D 53/1425 (2013.01);
(Continued)

(58) Field of Classification Search
CPC .. B01D 53/343; B01D 1/007; B01D 53/1425; B01D 53/1493; B01D 53/18;
(Continued)

(56) References Cited

U.S. PATENT DOCUMENTS 5,928,412 A * 7/1999 Bastholm ............... B01D 53/38
95/173
7,332,145 B2 * 2/2008 Chretien ................... C10L 3/12
423/576.8
(Continued)

FOREIGN PATENT DOCUMENTS

CN        105126588 A     12/2015
CN        105879596     *   8/2016
(Continued)

OTHER PUBLICATIONS

Epo translation of CN 105879596 (Year: 2016).*
(Continued)

*Primary Examiner* — Stephen Hobson
(74) *Attorney, Agent, or Firm* — thyssenkrupp North America, LLC

(57)           ABSTRACT

A gas scrubber may include an absorption apparatus configured for receiving a gas and absorbing the gas in an absorption medium, as well as an evaporation apparatus configured for evaporating at least a part of the liquid that is introduced. The absorption apparatus may have an introduction apparatus for the gas, an apparatus for circulating the absorption solution that has reacted with the gas, a discharge apparatus for at least a part of the absorption solution that has reacted with the gas, and a cooling system for the circulating absorption solution. The absorption apparatus and the evaporation apparatus can be connected via a heat
(Continued)

exchanger such that heat content of the absorption solution that has reacted with the gas is used at least in part for the evaporation.

8 Claims, 2 Drawing Sheets

(51) Int. Cl.
| | |
|---|---|
| *B01D 53/14* | (2006.01) |
| *B01D 53/18* | (2006.01) |
| *B01D 53/58* | (2006.01) |
| *B01D 53/79* | (2006.01) |
| *B01D 53/96* | (2006.01) |

(52) U.S. Cl.
CPC ......... *B01D 53/1493* (2013.01); *B01D 53/18* (2013.01); *B01D 53/58* (2013.01); *B01D 53/79* (2013.01); *B01D 53/96* (2013.01); *B01D 2251/504* (2013.01); *B01D 2251/506* (2013.01); *B01D 2257/406* (2013.01); *B01D 2258/02* (2013.01)

(58) Field of Classification Search
CPC ........ B01D 53/58; B01D 53/79; B01D 53/96; B01D 2251/504; B01D 2251/506; B01D 2257/406; B01D 2258/02
See application file for complete search history.

(56) References Cited

U.S. PATENT DOCUMENTS

| | | | | | |
|---|---|---|---|---|---|
| 7,699,908 | B2 * | 4/2010 | Menzel | ..................... | C10L 3/10 423/220 |
| 8,591,846 | B2 * | 11/2013 | Menzel | ............. | B01D 53/1462 48/127.7 |
| 2008/0210092 | A1 * | 9/2008 | Buckles | ............. | B01D 53/1462 95/227 |
| 2012/0039787 | A1 * | 2/2012 | Casara | ............... | B01D 61/3641 422/187 |
| 2012/0189528 | A1 * | 7/2012 | Casara | ..................... | C01C 1/12 423/356 |
| 2013/0055756 | A1 * | 3/2013 | Tsutsumi | ........... | B01D 53/1475 62/617 |
| 2015/0082981 | A1 * | 3/2015 | Shiflett | ............. | B01D 53/1487 95/237 |
| 2015/0273386 | A1 * | 10/2015 | Menzel | ................... | C10L 3/104 95/186 |
| 2016/0375398 | A1 * | 12/2016 | Hagimoto | ............... | C02F 1/325 95/179 |
| 2017/0114295 | A1 * | 4/2017 | Mak | ................... | C01B 17/0408 |
| 2018/0243688 | A1 * | 8/2018 | Hamrin | ................. | B01D 53/78 |
| 2019/0143262 | A1 * | 5/2019 | Ingram | ............. | B01D 53/1425 423/242.3 |
| 2019/0184334 | A1 * | 6/2019 | Moghaddam | ........... | F25B 15/02 |
| 2019/0331353 | A1 * | 10/2019 | Edström | ............ | B01D 53/1425 |
| 2019/0374902 | A1 * | 12/2019 | Ungerer | ............... | B01D 53/263 |
| 2020/0114302 | A1 * | 4/2020 | Miyamoto | .............. | C01B 32/50 |
| 2023/0053826 | A1 * | 2/2023 | De Angelis | ........ | B01D 53/1493 |
| 2025/0188353 | A1 * | 6/2025 | Quanci | ............. | B01D 53/1475 |

FOREIGN PATENT DOCUMENTS

| | | | | | | |
|---|---|---|---|---|---|---|
| CN | 105879596 | A | * | 8/2016 | ........ | B01D 53/1425 |
| CN | 106039960 | A | * | 10/2016 | ............ | B01D 53/78 |
| CN | 106268198 | A | * | 1/2017 | .............. | F23J 15/00 |
| CN | 106512691 | A | * | 3/2017 | ............ | B01D 53/96 |
| CN | 107149865 | A | * | 9/2017 | ............ | B01D 53/96 |
| CN | 108310930 | A | * | 7/2018 | ............ | B01D 53/26 |
| CN | 108579340 | A | * | 9/2018 | ........ | B01D 53/1425 |
| CN | 108744897 | A | * | 11/2018 | ........... | B01D 53/228 |
| CN | 108786381 | A | * | 11/2018 | ........ | B01D 53/1487 |
| CN | 110115910 | A | * | 8/2019 | ........ | B01D 53/1425 |
| CN | 111282406 | A | * | 6/2020 | .......... | B01D 53/263 |
| CN | 111701402 | A | * | 9/2020 | ........ | B01D 53/1475 |
| CN | 112742174 | A | * | 5/2021 | ........ | B01D 53/1418 |
| CN | 112933940 | A | * | 6/2021 | ............ | B01D 53/58 |
| CN | 113265282 | A | * | 8/2021 | ........ | B01D 53/1475 |
| CN | 114405258 | A | * | 4/2022 | ............ | B01D 53/62 |
| CN | 116510466 | A | * | 8/2023 | ........ | B01D 53/1475 |
| CN | 116899340 | A | * | 10/2023 | ............ | B01D 47/02 |
| CN | 118807409 | A | * | 10/2024 | ............ | B01D 53/18 |
| CN | 118831405 | A | * | 10/2024 | .............. | C05C 1/00 |
| CN | 119075609 | A | * | 12/2024 | ........ | B01D 53/1493 |
| CN | 119146627 | A | * | 12/2024 | ............ | F25B 33/00 |
| DE | 16 67 792 | A1 | | 7/1971 | | |
| EP | 0 172 660 | A2 | | 2/1986 | | |
| EP | 2 382 030 | A1 | | 11/2011 | | |
| EP | 2386346 | A1 | * | 11/2011 | ........... | C07C 273/04 |
| WO | WO-2006012606 | A2 | * | 2/2006 | ........... | C07C 253/34 |
| WO | WO-2011162869 | A1 | * | 12/2011 | ........... | B01D 53/343 |
| WO | WO-2014032766 | A2 | * | 3/2014 | ........ | B01D 53/1406 |
| WO | WO-2016075004 | A1 | * | 5/2016 | ............ | B01D 53/58 |
| WO | WO-2019107136 | A1 | * | 6/2019 | ........ | B01D 53/1493 |
| WO | WO-2023159264 | A1 | * | 8/2023 | ........ | B01D 53/1493 |

OTHER PUBLICATIONS

Applicant's admitted prior art (Fig 1, pp. 9-10) (Year: 2018).*
English Translation of International Search Report issued in PCT/EP2020/077742, dated Dec. 14, 2020.

* cited by examiner

EXHAUST GAS SCRUBBER WITH ENERGY INTEGRATION

CROSS REFERENCE TO RELATED APPLICATIONS

This application is a U.S. National Stage Entry of International Patent Application Serial Number PCT/EP2020/077742, filed Oct. 2, 2020, which claims priority to German Patent Application No. DE 10 2019 215 611.8, filed Oct. 11, 2019, and Belgian Patent Application No. 2019/5678, filed Oct. 11, 2019, the entire contents of all of which are incorporated herein by reference.

FIELD

The present disclosure generally relates to gas scrubbers and to processes for scrubbing gas incorporating a particular connection of scrubber and evaporation.

BACKGROUND

In offgas scrubbers of chemical plants, chemical reactions and/or high offgas temperatures result in some cases in the release of large amounts of heat.

For example, ammonia is scrubbed from the offgases of fertilizer plants, for example plants producing urea or ammonium nitrate-containing fertilizers, by an absorption process. To this end, a scrubbing agent which contains an acid, for example nitric acid or sulfuric acid, is generally used. The structure of a scrubber is known to those skilled in the art; for example a column having random packing may be used. Typically, scrubbing solution is circulated, regularly adding acid and discharging a part of the solution in order to limit the concentration. The discharged solution, e.g. ammonium sulfate or ammonium nitrate solution (salt solution) can be reused in a fertilizer complex. A high concentration is frequently sought here, which can be achieved for example by a subsequent evaporation. This requires additional consumption of a heat transfer medium (e.g. steam), which has disadvantageous effects on investment and operating costs of the plant.

High temperatures of the scrubbing solution in the scrubber are undesirable since they impair the absorption and, via excessive acid partial pressures, especially when using nitric acid, can contribute to the formation of aerosols which can be removed from the offgas again only with considerable effort. The circulating solution of the scrubber is therefore cooled, for example via a heat exchanger operated with cooling water. This is disadvantageous since the amount of heat removed is lost from the process and the additional cooling water consumption increases the investment and operating costs of the plant.

In order to optimize the economic viability and the environmental friendliness of a chemical plant, the consumption of an offgas scrubbing with subsequent evaporation should be minimized in terms of energy and operating media.

As prior art documents, CN 105126588 A, EP 0 172 660 A2 or U.S. Pat. No. 5,928,412 might be cited.

Thus a need exists for plants and processes that avoid the disadvantages of the prior art to date and/or further improve the plants and processes of the prior art to date.

DETAILED DESCRIPTION

Figure 1:
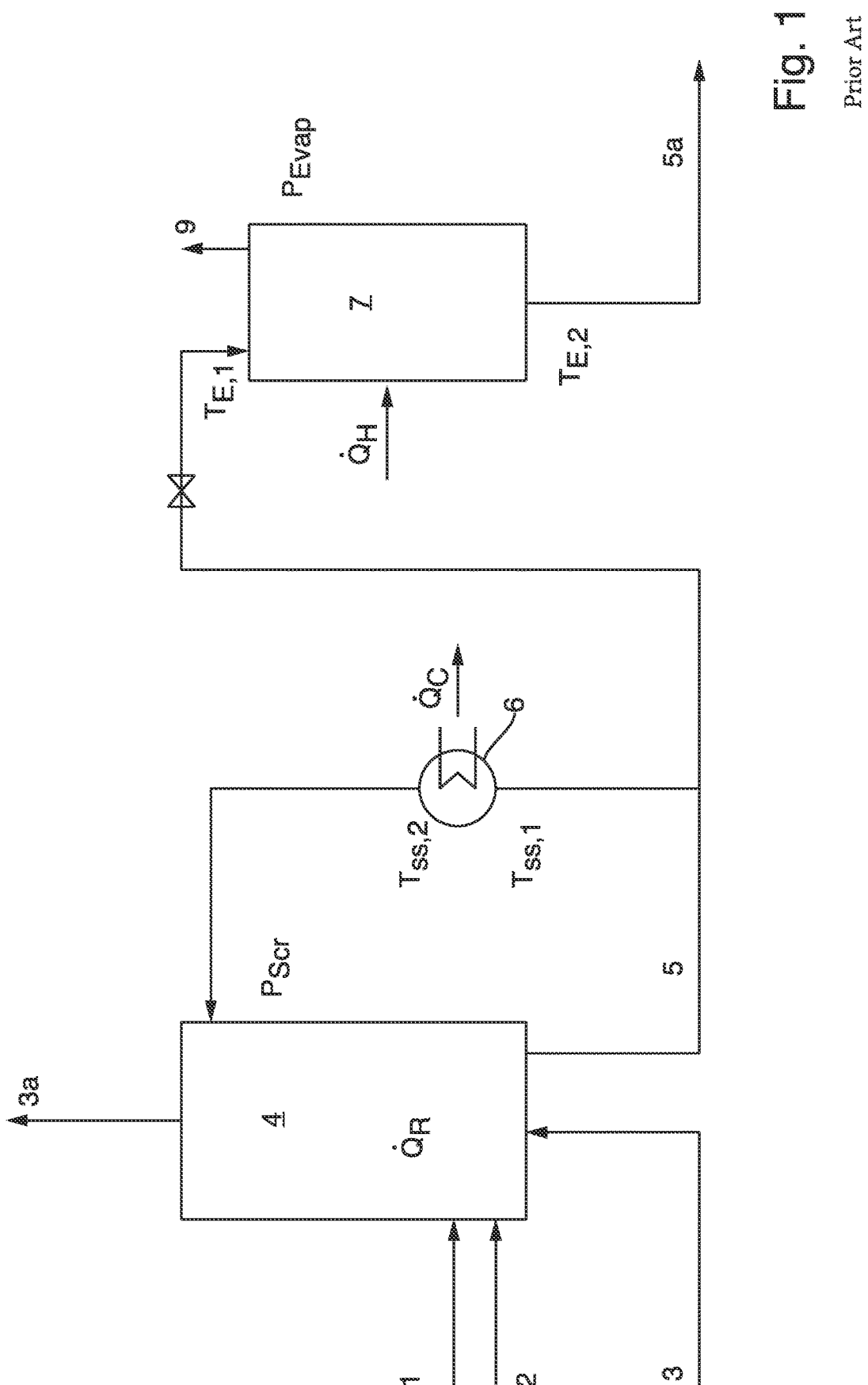
FIG. 1 is a schematic view of a conventional process according to the prior art to date.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Further configurations according to the invention and preferred subject matter emerge from the description which follows.

The present invention accordingly provides a gas scrubber comprising an absorption apparatus configured for receiving a gas and absorbing the gas in an absorption medium, wherein the absorption apparatus has an introduction apparatus for the gas, has an apparatus for circulating the absorption solution that has reacted with the gas, has a discharge apparatus for at least a part of the absorption solution that has reacted with the gas, has a cooler for the circulating absorption solution, an evaporation apparatus configured for evaporating at least a part of the liquid introduced, wherein the absorption apparatus and the evaporation apparatus are connected via a heat exchanger in such a way that the heat content of the absorption solution that has reacted with gas is used at least in part for the evaporation.

The present invention further provides a process for scrubbing gas, comprising the process steps: introducing a gas into an absorption apparatus, circulating the absorption solution, discharging a part of the circulating solution produced, concentrating the discharged solution by evaporating at least a part of the absorption medium, wherein the heat content of the circulating solution is used at least in part for the evaporation.

In the context of the present invention, the terms "salt solution" and "absorption solution" are used synonymously for the solution which is obtained in the neutralization of acid and ammonia-containing gas in the acid scrubber.

The invention therefore relates to a process for the cleaning of offgases from chemical plants with the simultaneous use of the offgas heat and heat of reaction, arising during the offgas cleaning, within the chemical plant, and to corresponding gas scrubbers.

A process has been developed which extracts heat from the circulating solution and uses it to increase the concentration of the discharged solution (so-called heat integration of both process steps). The consumption of the operating media steam or heat transfer medium and cooling water is reduced in the process, and at the same time the apparatus complexity is reduced since cooling and evaporation take place in one heat exchanger apparatus. One possible embodiment of such a heat exchanger is a falling-film evaporator; the structure of such a shell and tube heat exchanger is known to those skilled in the art. This is supplied at the bottom on the shell side with the warm circulating solution from the bottom of the scrubber as heating medium and on the tube side in counter-current with the solution to be evaporated that has been discharged from the scrubbing circuit. Using suitable apparatus measures, the solution is distributed over the upper tube sheet and runs down along the inner wall of the tubes. In the process, a proportion of the water is evaporated from the solution by the heat input and the solution is thus concentrated.

In order to ensure the necessary temperature difference between the hot and the cold side of the heat exchanger, the pressure on the cold side is selected such that the boiling temperature of the solution is always below the temperature of the circulating solution of the scrubber and hence heat transfer can take place.

The conditions for an integrated cooler-evaporator unit in the context of the present invention or for a process in which cooling and evaporating of the salt solution (absorption solution)—consisting essentially of water and ammonium nitrate—are the following:

The temperature levels of the solution at the evaporator ($T_{E,1}$ or $T_{E,2}$) and those in the absorber-cooler/circulation cooler ($T_{SS,1}$ or $T_{SS,2}$) must overlap. The temperature $T_{SS,1}$ (i.e. the temperature at which the salt solution enters the cooling unit) must in this case be greater than the temperature $T_{E,2}$ (i.e. the temperature at which the salt solution exits the evaporator—then as a more concentrated solution).

The amount of heat $Q_H$ required for the evaporation of the salt solution in the evaporator must be at least predominantly covered by the amount of heat $Q_C$ that is released in the acid scrubber/circulation cooler.

If the above two conditions are not fully met, the integrated process according to the present invention can be modified by the following options 1 and/or 2.

Option 1: A heat exchanger or a heating apparatus may be introduced into the course of the salt solution discharged from the acid scrubber, via which the temperature of the salt solution (e.g. ammonium nitrate solution) can be increased so that the temperature on entry into the cooling unit (temperature $T_{SS,1}$) is sufficiently high. This measure also increases the overall amount of heat available.

Option 2: A second evaporator stage may be introduced into the course of the concentrated salt solution downstream of the integrated cooler-evaporator unit according to the present invention. In this manner, the first, integrated evaporation stage may be operated at relatively low exit concentrations, which reduces the required temperature at which the concentrated salt solution exits the integrated cooler-evaporator unit (temperature $T_{E,2}$).

In the context of the present invention, the pressure in the integrated cooler-evaporator unit should always be set to be lower than the pressure in the acid scrubber.

The achievable concentration of the concentrated salt solution is determined in the context of the present invention by the amount of usable heat.

If the temperature $T_{E,2}$ at which the concentrated salt solution leaves the integrated cooler-evaporator is higher or at least just as high as the temperature $T_{SS,1}$ at which the not yet concentrated salt solution enters the integrated cooler-evaporator, then the pressure in the evaporator can be reduced and the concentration in the absorber increased and/or options 1 and/or 2 can be additionally employed.

If the amount of heat in the absorber (acid scrubber) is lower than the available amount of heat in the evaporation, then it is possible to increase the concentration in the absorber and/or to additionally use option 1 and/or 2.

In a variant of the present invention, in particular for the case of ammonia scrubbing with nitric acid and subsequent evaporation, the following operating parameters are preferred:

The pressure in the ammonia absorber (acid scrubber) can be as desired.

The temperature in the ammonia absorber (acid scrubber) should be lower than 70° C. for the avoidance of aerosol formation.

The pH in the ammonia absorber (acid scrubber) should be greater than 0.5 for the avoidance of aerosol formation.

The salt concentration of the salt solution exiting the absorber should be 40 to 80 percent by weight. If the concentration is too high, there is a risk of crystallization.

The pressure for the evaporation of the salt solution (ammonium nitrate solution) should be atmospheric pressure (1013 mbar) or a vacuum. Preference is given to pressures of 0.2 to 1.1 bara.

The temperatures for the evaporation are generally not set directly, but are preferably regulated indirectly via the pressure. Nevertheless, it should be borne in mind that this is subject to a lower limit as a result of the crystallization point of the respective final concentration of the salt solution (i.e. the concentration on exiting the evaporator). This is known to those skilled in the art and requires no further explanation here.

The final concentration of the ammonium nitrate solution at the exit from the integrated cooler-evaporator unit is preferably between 60 and 80 percent by weight, particularly preferably in accordance with the requirements of the downstream process.

Within the context of the present invention, a conventional process for offgas scrubbing and subsequent evaporation was used as a starting point. A high consumption of cooling water and steam became evident with this. Since the intention was for this process to be able to be carried out in existing plants with a limited availability of utilities, this would impede implementation. The complete, conventional process (scrubber+evaporation) was subjected to a test (inter alia calculation of the mass balances including the utility consumptions (cooling water and steam) and determination of the suitable operating parameters for the conventional process).

In the course of this testing, it was then surprisingly found that the configurations according to the invention can avoid the disadvantages of such conventional processes.

In the context of the present invention, the device unit formed of heat exchanger and evaporation apparatus is also referred to as integrated cooler-evaporator.

In the context of the present invention, the absorption apparatus is also referred to as acid scrubber.

In the context of the present invention, the evaporation apparatus is also referred to as evaporator.

The present invention inter alia also provides the following embodiments designated with Roman numerals:

Embodiment I. A gas scrubber comprising a) an absorption apparatus configured for receiving a gas and absorbing the gas in an absorption medium, wherein the absorption apparatus i) has an introduction apparatus for the gas, ii) has an apparatus for circulating the absorption solution that has reacted with the gas, iii) has a discharge apparatus for at least a part of the absorption solution that has reacted with the gas, this portion preferably being determined depending on the desired concentration of the bleed and the amount and loading of the absorbed gas, b) a cooler for the circulating absorption solution, c) an evaporation apparatus configured for evaporating at least a part of the liquid introduced, characterized in that the cooler and the evaporation apparatus are connected via a heat exchanger in such a way or are designed as a heat exchanger in such a way that the heat content of the absorption solution that has reacted with gas is used at least in part for the evaporation.

Embodiment II. The gas scrubber according to embodiment I, characterized in that the gas scrubber is configured for the treatment of an offgas, in particular an ammonia-containing offgas, and for absorption with an acid-containing scrubbing medium, in particular an aqueous solution containing nitric acid or sulfuric acid.

Embodiment III. The gas scrubber according to either of embodiments I and II, characterized in that the heat exchanger is a recuperator, preferably a falling-film evaporator, particularly preferably a shell and tube heat exchanger.

Embodiment IV. The gas scrubber according to any of the preceding embodiments, characterized in that the absorption apparatus is a column comprising internals (random packing, structured packing, separating trays) or a venturi scrubber.

Embodiment V. The gas scrubber according to any of the preceding embodiments, characterized in that the heat exchanger is configured such that the circulated absorption solution that has reacted with the gas is guided as heating medium into the heat exchanger, and the portion diverted from the absorption solution that has reacted with the gas is guided in counter-current into the heat exchanger as a medium to be evaporated, wherein the gas scrubber is preferably configured to set the temperature of the circulated absorption solution that has reacted with the gas and is entering the heat exchanger to be higher than the temperature of the portion diverted from the absorption solution that has reacted with the gas and entering the heat exchanger.

Embodiment VI. The gas scrubber according to any of the preceding embodiments, additionally comprising an apparatus for reducing the pressure on the cooler side of the heat exchanger. As a matter of principle, this leads to flash evaporation, since the pressure on the cooler side is necessarily reduced to boiling condition in order to achieve the required lower temperature level.

Embodiment VII. The gas scrubber according to any of the preceding embodiments, additionally comprising an apparatus for the feeding in of fresh absorption medium.

Embodiment VIII. The gas scrubber according to any of the preceding embodiments, additionally comprising a heat exchanger additionally arranged in the circuit of the circulating solution and configured for regulating the temperature of the circulating solution, in particular for increasing the temperature of the circulating solution, where steam or process heat can be used as the heat transfer medium, or a second evaporation stage arranged downstream of the first evaporation stage, or a heat exchanger arranged in the circuit of the circulating solution and configured for regulating the temperature of the circulating solution, in particular for increasing the temperature of the circulating solution, where steam or process heat can be used as the heat transfer medium, and a second evaporation stage arranged downstream of the first evaporation stage, or a further heat exchanger or a heating apparatus configured for additional heating of the salt solution discharged from the acid scrubber prior to entering the, or at least one further evaporator stage configured for further evaporation of the concentrated salt solution after leaving the evaporator, especially comprising a further heat exchanger or a heating apparatus configured for additional heating of the salt solution discharged from the acid scrubber prior to entering the, or at least one further evaporator stage configured for further evaporation of the concentrated salt solution after leaving the evaporator, or very particularly preferably comprising a further heat exchanger or a heating apparatus configured for additional heating of the salt solution discharged from the acid scrubber prior to entering the, and at least one further evaporator stage configured for further evaporation of the concentrated salt solution after leaving the evaporator.

Embodiment IX. A process for scrubbing gas, comprising the following process steps:

I) introducing a gas into an absorption apparatus,

II) circulating the absorption solution,

III) discharging a part of the circulating solution produced by step II),

IV) concentrating the discharged solution by evaporating at least a part of the absorption medium, characterized in that the heat content of the circulating solution is used at least in part for the evaporation in step IV).

Embodiment X. The process according to embodiment IX, characterized in that the circulating solution and the discharged solution are both conducted separately through a common heat exchanger, the circulating solution being fed to the heat exchanger as heating medium and the discharged solution being fed to the heat exchanger in counter-current as medium to be evaporated.

Embodiment X. The process according to either of embodiments IX and X, characterized in that the gas is an offgas, in particular an ammonia-containing offgas.

Embodiment XII. The process according to any of embodiments IX to XI, characterized in that the absorption medium is an acid-containing scrubbing medium, in particular an aqueous solution containing nitric acid or sulfuric acid.

Embodiment XII. The process according to any of embodiments IX to XII, characterized in that the temperature of the circulating solution entering the heat exchanger is higher than the solution present in the evaporator.

Embodiment XIV. The process according to any of embodiments IX to XIII, characterized in that the pressure on the side of the heat exchanger at which the evaporation takes place is adjusted or regulated such that it is lower than the pressure on the side of the heat exchanger through which the circulating solution is conducted, preferably such that the temperature of the solution to be evaporated is below the temperature of the circulating solution, especially such that the boiling temperature of the solution to be evaporated is below the temperature of the circulating solution.

Embodiment XV. The process according to any of embodiments IX to XIV, characterized in that in addition either the salt solution discharged from the acid scrubber is additionally heated prior to entering the heat exchanger, preferably by means of a further heat exchanger or a heating apparatus, or the concentrated salt solution after leaving the evaporator is further evaporated, preferably by at least one further evaporator stage, or both the salt solution discharged from the acid scrubber is additionally heated prior to entering the heat exchanger, preferably by means of a further heat exchanger or a heating apparatus, and the concentrated salt solution after leaving the evaporator is further evaporated, preferably by at least one further evaporator stage.

Embodiment XVI. The process according to any of embodiments IX to XV, characterized in that it is carried out using a gas scrubber according to any of embodiments I to VII.

The present invention is elucidated in more detail hereinbelow with reference to the drawings. The drawings are not to be interpreted as limiting and are not to scale. The drawings moreover do not contain all of the features comprised by customary plants but rather are reduced to the features essential to the present invention and for the understanding thereof. Identical reference signs in the various figures each have the same meaning, as given in the list of reference signs.

FIG. 1 illustrates a conventional process according to the prior art to date.

To this end, acid 1 and water 2 are introduced into an acid scrubber 4 and additionally ammonia-containing offgas 3; cleaned offgas 3a then exits the acid scrubber. A salt solution (ammonium nitrate solution) is formed from the acid and gas in the acid scrubber and exits downwards as salt solution 5. A part of this salt solution 5 is circulated and fed back to the acid scrubber 4 as a scrubbing solution. As part of this circulation of the salt solution 5, the latter is cooled by a circulation cooler 6. The temperature $T_{SS,1}$ is the temperature at which the salt solution 5 enters the circulation cooler 6 and the temperature $T_{SS,2}$ is the temperature at which the salt solution 5 exits the circulation cooler 6 again. The acid scrubber 4 is operated here with a pressure $p_{SCR}$. The portion of the salt solution 5 that is not circulated is then conducted to an evaporator 7. This salt solution 5 has an entry temperature into the evaporator 7 $T_{E,1}$. The salt solution 5 is concentrated in the evaporator 7 in that a part of the liquid is evaporated and leaves the evaporator 7 as steam 9. The concentrated salt solution 5a leaves the evaporator 7 at a lower temperature $T_{E,2}$. The evaporator 7 is operated with a pressure $p_{Evap}$. The heat of reaction $Q_R$ is used in the acid scrubber 4. In the circulation cooler 6, the temperature of the salt solution 5 is lowered and heat is removed as cooling power $Q_C$. In the evaporator 7 heat energy is input via the heating power $Q_H$.

According to this conventional prior art process, two different apparatuses are needed in order firstly to cool the salt solution (the circulation cooler) and in order secondly to concentrate the salt solution by evaporation, namely the evaporator.

Figure 2:
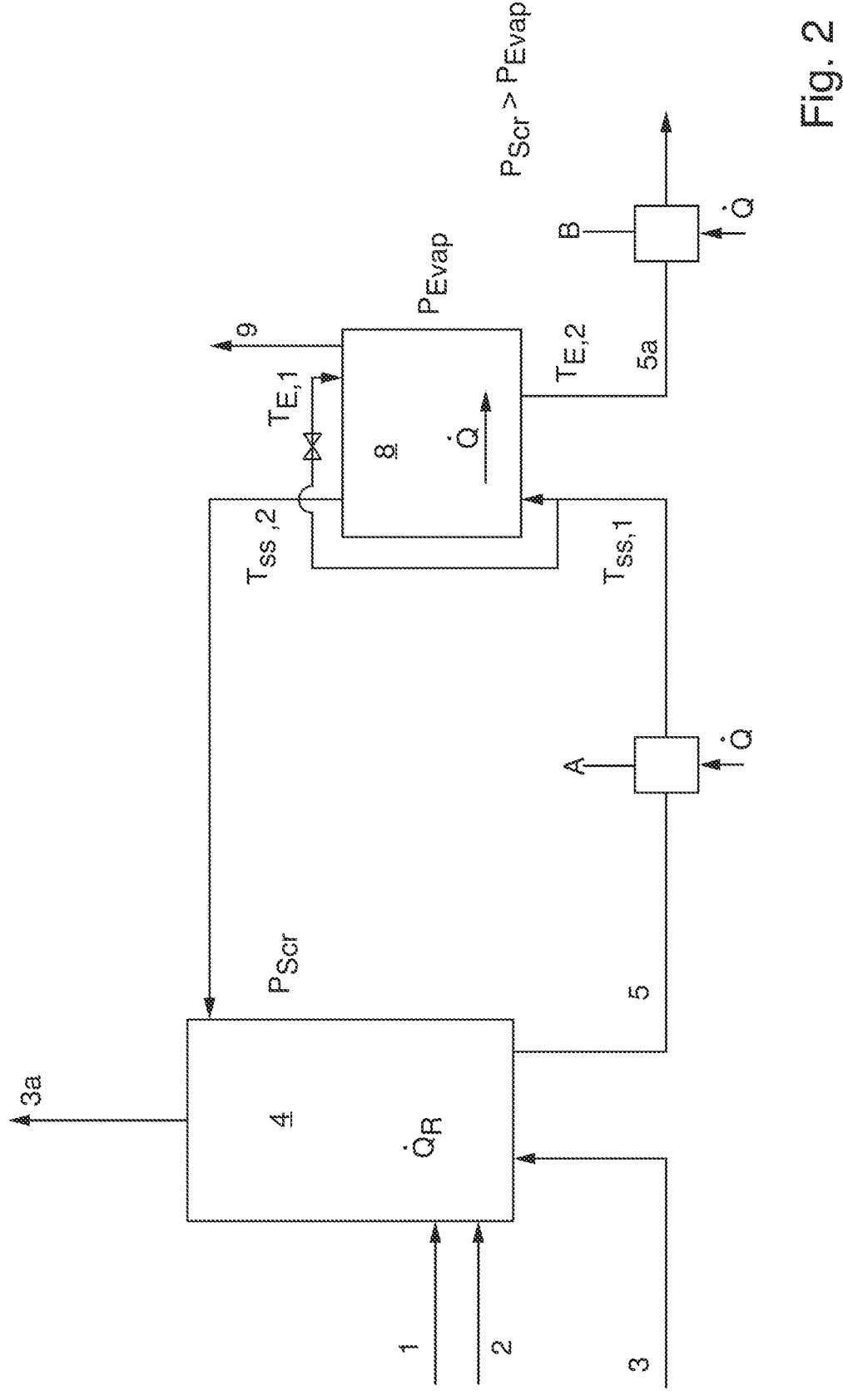
FIG. 2 is a schematic view that describes an example process of the present disclosure that is based on the same premises as the conventional process shown in FIG. 1.

FIG. 2 describes a process according to the invention which is based on the same premises as the conventional process shown in FIG. 1.

Here, too, acid and water or makeup water 2 are reacted with offgas 3 in an acid scrubber 4 and cleaned offgas 3a is obtained. Salt solution 5 is discharged from the acid scrubber 4 and sent to further processing. In contrast to the conventional prior art process, however, an integrated cooler-evaporator 8 is used in the process according to the invention, in which the cooling of the salt solution 5 and the evaporation of the salt solution 5 take place together. Here too, the salt solution 5 has an entry temperature $T_{SS,1}$ which is higher than the exit temperature $T_{SS,2}$, before a part of the salt solution 5 is then recycled back into the acid scrubber 4. In contrast to the processes and/or apparatuses of the prior art, however, in the integrated cooler-evaporator 8 according to the present invention, the absorption apparatus 4 and the evaporation apparatus 7 are connected via a heat exchanger in such a way that the heat content of the salt solution that has reacted with gas is not extracted via a circulation cooler and then lost, but is instead also used directly for evaporation of the salt solution 5 to give a concentrated salt solution 5a with the release of steam 9. For this, FIG. 2 illustrates that, prior to entering the integrated cooler-evaporator 8, the salt solution 5 is divided and only the part circulating via the scrubber is led through the cooler-evaporator 8 for cooling and another part is branched off, routed around the cooling unit and is introduced on the other side of the integrated cooler-evaporator unit 8 with the temperature $T_{E,1}$ and finally leaves the integrated cooler-evaporator unit 8 as concentrated salt solution 5a with the temperature $T_{E,2}$. In this integrated process, the pressure $p_{SCR}$ in the acid scrubber 4 is greater than the pressure $p_{Evap}$ in the integrated cooler-evaporator 8.

In FIG. 2, the letters A and B furthermore show two different options which can be present independently of one another, but do not have to be. Option 1, shown with the letter A, comprises additional preheating of the salt solution (absorption solution). The second option, shown with the letter B, comprises the one additional evaporation unit. Both option A and option B require the supply of amounts of heat Q and are, as already stated, optional.

It is pointed out that, in the legend to the figures and the description thereof, the "Q", illustrated scientifically correctly, would have to be a "Q" with a dot on top, but for typesetting and printing reasons in the context of the present description is illustrated as a simple "Q"; in the figures it is correctly represented as "Q with dot".

LIST OF REFERENCE SIGNS 1 acid
2 water (makeup)
3 offgas
3a cleaned offgas
4 acid scrubber
5 salt solution
5a concentrated salt solution
6 circulation cooler
7 evaporator
8 integrated cooler-evaporator (according to the invention)
9 steam
$T_{E,1}$ entry temperature of the solution to be evaporated at the evaporator
$T_{E,2}$ exit temperature of the solution to be evaporated at the evaporator
$T_{SS,1}$ entry temperature of the circulating stream to be cooled at the cooler
$T_{SS,2}$ exit temperature of the circulating stream to be cooled at the cooler
Q heat/amount of heat
$Q_R$ heat of reaction
$Q_C$ cooling power
$Q_H$ heating power
$p_{SCR}$ scrubber pressure
$p_{Evap}$ evaporator pressure
A option 1
B option 2

What is claimed is:
1. A process for scrubbing gas comprising:
introducing the gas into an absorption apparatus;
circulating a circulating absorption solution;
discharging a part of the circulating absorption solution;

concentrating a discharged solution, which is the part of the circulating absorption solution that is discharged, by evaporating at least a part of an absorption medium, wherein heat content of the circulating absorption solution is used at least in part for the evaporating at least the part of the absorption medium; and conducting the circulating absorption solution and the discharged solution separately through a heat exchanger, wherein the circulating absorption solution is fed to the heat exchanger as a heating medium and the discharged solution is fed to the heat exchanger in counter-current as medium to be evaporated.

2. The process of claim 1 wherein either:

the gas is an ammonia-containing offgas;

the absorption medium is an aqueous solution containing nitric acid or sulfuric acid; or the gas is an ammonia-containing offgas and the absorption medium is an aqueous solution containing nitric acid or sulfuric acid.

3. The process of claim 1 wherein a temperature of the circulating absorption solution entering the heat exchanger is higher than a temperature of a solution exiting an evaporator used for the evaporating at least the part of the absorption medium.

4. The process of claim 1 comprising adjusting or regulating a pressure on a side of the heat exchanger at which the evaporating at least the part of the absorption medium takes place such that the pressure is lower than a pressure on a side of the heat exchanger through which the circulating absorption solution is conducted.

5. The process of claim 1 comprising adjusting or regulating a pressure on a side of the heat exchanger at which the evaporating at least the part of the absorption medium takes place such that the pressure is lower than a pressure on a side of the heat exchanger through which the circulating absorption solution is conducted and such that an exit temperature of the absorption medium to be evaporated is below an entry temperature of the circulating absorption solution.

6. The process of claim 1 comprising adjusting or regulating a pressure on a side of the heat exchanger at which the evaporating at least the part of the absorption medium takes place such that the pressure is lower than a pressure on a side of the heat exchanger through which the circulating absorption solution is conducted and such that a boiling temperature of the absorption medium to be evaporated is below a temperature of the circulating absorption solution.

7. The process of claim 1 wherein at least one of:

a salt solution exiting an acid scrubber is heated prior to entering the heat exchanger;

or a concentrated salt solution is evaporated after leaving an evaporator used for the evaporating at least the part of the absorption medium.

8. The process of claim 1 performed using a gas scrubber that comprises:

the absorption apparatus configured to receive the gas and to absorb the gas in the absorption medium, wherein the absorption apparatus comprises:

an introduction apparatus for the gas, an apparatus for circulating the circulating absorption solution that has reacted with the gas, and a discharge apparatus for discharging the part of the circulating absorption solution;

a cooler for the circulating absorption solution; and an evaporation apparatus configured to evaporate the part of the absorption medium, wherein the cooler and the evaporation apparatus are connected via the heat exchanger or are configured as the heat exchanger such that heat content of the circulating absorption solution that has reacted with the gas is used at least in part for the evaporation.

\* \* \* \* \*